3,058,922
POLYMERS OF METHALLYL CHLORIDE EPOXIDE
Edwin J. Vandenberg, Wilmington, Del., assignor to Hercules Powder Company, Wilmington, Del., a corporation of Delaware
No Drawing. Filed Sept. 30, 1959, Ser. No. 843,370
4 Claims. (Cl. 260—2)

This invention relates to new polymeric materials and more particularly to polymers of methallyl chloride epoxide.

In accordance with this invention it has been found that methallyl chloride epoxide, 2-methyl-3-chloro-1,2-epoxypropane, having the structural formula

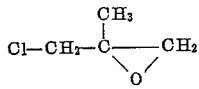

may be polymerized to yield polymers which are crystalline or amorphous linear polyethers having

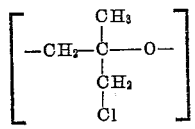

repeating units.

The crystalline polymers are believed to have an isotactic structure. The new crystalline polymers when of low molecular weight are hard, wax-like solids. They are useful as synthetic chlorinated waxes and wax additives for coating and impregnating paper, and in wax polishes. These polymers are also useful in many other protective coatings. Higher molecular weight crystalline polymers are useful for hard, tough injection molded articles, films or filaments. Crystalline polymers of methallyl chloride epoxide having melting points from about 92° to 124° C. and higher can be prepared.

Low molecular weight amorphous polymers are liquids useful as plasticizers, lubricants, oil additives, etc. Higher molecular weight amorphous polymers are useful elastomers which can be cross-linked through their chlorine groups with diamines, etc., to vulcanized compositions.

The methallyl chloride epoxide utilized in this invention may be prepared by conversion of beta-methallyl chloride to the bromohydrin by the method of Hurd and Abernathy, J. Am. Chem. Soc., vol. 63, page 976 (1941), and dehydrohalogenation of the bromohydrin by the method of Hurd and Winberg, J. Am. Chem. Soc., vol. 73, page 917 (1951).

The new polymers of this invention may be prepared by contacting methallyl chloride epoxide with an aluminum alkyl as catalyst. Any aluminum alkyl may be used, as, for example, a trialkylaluminum, a dialkylaluminum monohalide, a dialkylaluminum monohydride, a monoalkylaluminum dihydride, a dialkylaluminum monoalkoxide, etc. The alkylaluminum compound may be used as such or it may be complexed with an ether such as tetrahydrofuran, or reacted with a chelating agent such as acetylacetone or with water within specified molar ranges. When the alkylaluminum compound is reacted with water, the amount of water will usually be within the range of 0.5 to 1 mole of water per mole of alkylaluminum compound, but a ratio of from about 0.1:1 to about 2:1 may be used. The alkyl group of the alkylaluminum compound may be any alkyl, as for example, methyl, ethyl, butyl, isobutyl, hexyl, octyl, etc.

The polymerization reaction may be carried out in bulk but generally is carried out in a solution or suspension in an inert organic diluent. Exemplary of the diluents that may be used are the ethers such as diethyl ether, dipropyl ether, etc., halogenated hydrocarbons such as chlorobenzene, methylene chloride, etc., a hydrocarbon diluent such as n-heptane, cyclohexane, benzene, toluene, etc., or mixtures of these, as desired. Hydrocarbon diluents such as n-heptane are especially preferred.

The polymerization reaction may be carried out at any desired temperature and pressure. Usually atmospheric or autogenous pressure will be used and a temperature of from about −80° C. to about 150° C. and preferably from about 0° C. to about 100° C. will be used.

The following examples will illustrate the preparation of the new polymers of methallyl chloride epoxide. All parts and percentages are by weight unless otherwise indicated. The molecular weight of the polymers is shown by their reduced specific viscosity (RSV). By the term "reduced specific viscosity" is meant the $\eta_{sp}/c$ determined on a solution of the polymer in alpha chloronaphthalene at 100° C. and at a concentration of 0.1 g. of polymer per 100 cc. of solution unless otherwise specified. Where the melting point of the polymer is given, it is the temperature at which birefringence due to crystallinity disappears.

*Example 1*

A polymerization vessel in which air had been replaced with nitrogen was charged with 13.6 parts of diethyl ether and 10 parts of methallyl chloride epoxide. After equilibrating at 30° C., 5.6 parts of a solution of catalyst was injected. The catalyst was prepared by diluting a 0.9 molar solution of triisobutylaluminum in n-heptane to 0.5 molar with diethyl ether, cooling in ice water and then injecting 0.5 mole of water per mole of triisobutylaluminum, venting as necessary. The catalyst solution was then agitated for about 20 hours at 30° C. and was stored at room temperature.

The polymerization was conducted with agitation for 43 hours at 30° C., after which 4 parts of anhydrous ethanol was added to the polymerization reaction mixture. The polymer formed was soluble in ether. The polymerization reaction mixture containing the ether-soluble polymer was washed twice with water containing 3% by weight of HCl and then was washed with water until neutral, after which the solution of the polymer was concentrated, and the polymer was isolated therefrom by precipitation with about 10 volumes of methanol. The methanol-insoluble polymer thus obtained was washed with methanol, then with methanol containing 0.2% of 4,4'-thiobis(6-tert-butyl-m-cresol), and dried in vacuum at 50° C. It was a white powder, highly crystalline by X-ray diffraction, with a melting point of 105° C. The diffraction lines of the X-ray powder pattern had the following crystal lattice spacings and relative intensities:

| Crystal Lattice Spacing, A. | Approximate Relative Intensity on a Scale of 10 (10 being most intense) |
|---|---|
| 6.10 | 10 |
| 4.78 | 6 |
| 3.95 | 8 |
| 3.54 | 4 |
| 3.04 | 3 |
| 2.79 | 1 |
| 2.68 | 3 |
| 2.11 | 2 |

Its infrared spectrum was in accord with the assigned structure for a polymer having

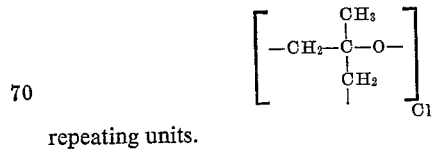

repeating units.

Example 2

A polymerization vessel in which air had been replaced with nitrogen was charged with 12.4 parts of n-heptane and 5 parts of methallyl chloride epoxide. After equilibrating at 30° C., 1.6 parts of a 0.9 molar solution of triisobutylaluminum in n-heptane was injected as catalyst. After 20 hours agitation at 30° C., another equal portion of the above catalyst was injected. After 6 more hours of agitation at 30° C., another equal portion of the above catalyst was injected. Agitation was then continued for an additional 17 hours at 30° C., thus making 43 hours total. The polymerization was then stopped by adding 2 parts of anhydrous ethanol. Diethyl ether was added to the polymerization reaction mixture which was then washed twice with water containing 10% NaOH, agitating for 5 minutes for each wash, and then washed neutral with water. Ether-insoluble polymer was recovered by centrifuging, washing twice with diethyl ether and once with ether containing 0.2% of 4,4'-thiobis(6-tert-butyl-m-cresol), and then drying in vacuum at about 50° C. The dried polymer amounting to 0.23 part was a hard white solid, partly insoluble in chloroform, largely insoluble in alpha chloronaphthalene at room temperature, but soluble in hot alpha chloronaphthalene. It was of moderate crystallinity by X-ray, having the same X-ray pattern as noted for the polymer in Example 1. It had an RSV of 0.06 and a crystalline melting point of 95° C. The infrared spectra was in accord with the assigned structure. It analyzed 32.9% Cl, 44.8% C and 6.87% H (theory: 33.3% Cl, 45.1% C and 6.62% H).

The solvent was stripped from the ether-soluble fraction and a methanol-insoluble fraction was precipitated therefrom by addition of 80 parts of methanol. The methanol-insoluble polymer was collected, washed once with methanol and then once with methanol containing 0.2% of 4,4'-thiobis(6-tert-butyl-m-cresol). After drying, 1.27 parts of a soft, tacky solid was obtained which was largely soluble in alpha chloronaphthalene at room temperature. It was of low crystallinity by X-ray, i.e., it was largely amorphous. Its infrared spectra was the same as the spectra for the ether-insoluble polymer described hereinabove, except that bands due to crystallinity were weak. This ether-soluble, methanol-insoluble polymer had an RSV of 0.03.

An ether-soluble, methanol-soluble polymer was recovered by evaporating off the methanol from the residual material remaining after precipitation of the above ether-soluble methanol-insoluble polymer, and drying, to yield 1.1 parts of a very viscous liquid having an RSV of 0.013 in 1% concentration.

Example 3

Example 2 was followed in carrying out the polymerization procedure of this example, with the exception that 15.8 parts of dry toluene was charged to the polymerization vessel in place of the 12.4 parts of n-heptane used in Example 2. Example 2 was also followed in working up the polymer products formed, except that the total ether-soluble polymer was isolated as one product instead of separating the same into methanol-insoluble and methanol-soluble fractions.

The ether-insoluble polymer recovered was a hard solid of moderately high crystallinity by X-ray, having the same X-ray pattern as noted for the crystalline polymer in Example 1, having a melting point of about 103° C. and an RSV of 0.02 in 0.05% concentration.

The ether-soluble polymer was a very viscous liquid having an RSV of 0.013 in 1% concentration.

Example 4

A polymerization vessel from which air had been replaced with nitrogen was charged with 9 parts of n-heptane and 5 parts of methallychloride epoxide. After equilibrating at 30° C., 2.8 parts of a solution of catalyst was injected. The catalyst employed was prepared as described in Example 1. The polymerization was conducted with agitation at 30° C. for a total of 66 hours, injecting additional catalyst solution at 19 hours, 24 hours, 43 hours and 49 hours, each additional amount of catalyst being equal to the initial catalyst charge. Example 2 was followed exactly in working up the polymer products formed.

The ether-insoluble polymer was a hard solid of high crystallinity by X-ray, having the same X-ray pattern as noted for the crystalline polymer in Example 1. It had a crystalline melting point of 124° C. and an RSV of 0.06.

The ether-soluble, methanol-insoluble polymer was a tough, white solid of moderate crystallinity by X-ray, having the same X-ray pattern as noted for the crystalline polymer in Example 1. It had a crystalline melting point of 92° C. and an RSV of 0.06.

The ether-soluble, methanol-soluble polymer was a viscous liquid having an RSV of 0.02.

This application is a continuation-in-part of my co-pending application Serial No. 738,626, filed on May 29, 1958, now abandoned.

What I claim and desire to protect by Letters Patent is:

1. As a new composition of matter a homopolymer of methallyl chloride epoxide.

2. As a new composition of matter a homopolymer of methallyl chloride epoxide having

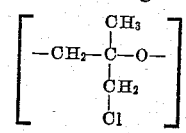

repeating units.

3. As a new composition of matter a crystalline homopolymer of methallyl chloride epoxide.

4. As a new composition of matter a predominantly amorphous homopolymer of methallyl chloride epoxide.

References Cited in the file of this patent

UNITED STATES PATENTS

| | | |
|---|---|---|
| 2,498,195 | Ballard et al. | Feb. 21, 1950 |
| 2,870,100 | Stewart et al. | Jan. 20, 1959 |
| 2,871,219 | Baggett et al. | Jan. 27, 1959 |